(12) United States Patent
Brodie et al.

(10) Patent No.: US 8,139,064 B2
(45) Date of Patent: Mar. 20, 2012

(54) METHOD AND APPARATUS FOR ALIGNING AN INFRASTRUCTURE TO A TEMPLATE

(75) Inventors: Mark Alan Brodie, Braircliff, NY (US); Ashwin Lall, Rochester, NY (US); Anca Sailer, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 11/972,862

(22) Filed: Jan. 11, 2008

(65) Prior Publication Data

US 2009/0179897 A1    Jul. 16, 2009

(51) Int. Cl.
*G06T 11/20* (2006.01)
(52) U.S. Cl. ......................... 345/440; 345/418
(58) Field of Classification Search .................. 345/440, 345/418; 703/2; 370/254
See application file for complete search history.

(56) References Cited

U.S. PATENT DOCUMENTS

| | | | |
|---|---|---|---|
| 2002/0118207 A1* | 8/2002 | Jagla | 345/581 |
| 2003/0224344 A1* | 12/2003 | Shamir et al. | 435/4 |
| 2005/0038818 A1 | 2/2005 | Hooks | |
| 2005/0091227 A1 | 4/2005 | McCollum et al. | |
| 2005/0177628 A1 | 8/2005 | Victoria et al. | |
| 2005/0190704 A1* | 9/2005 | Zhang et al. | 370/254 |
| 2006/0111874 A1 | 5/2006 | Curtis et al. | |
| 2006/0274062 A1* | 12/2006 | Zhang et al. | 345/420 |
| 2008/0300834 A1* | 12/2008 | Wiemer et al. | 345/440 |
| 2009/0168665 A1* | 7/2009 | Resende et al. | 370/254 |
| 2009/0315890 A1* | 12/2009 | Modani | 345/440 |
| 2010/0207947 A1* | 8/2010 | Sagalov | 345/440 |

OTHER PUBLICATIONS

C. Adam et al., "Implementation of a Service Middleware that Scales in System Size and Applications," 10th IFIP/IEEE International Symposium on Integrated Network Management (IM '07), May 2007, pp. 70-79.
M. Goldszmidt et al., "On the Quantification of e-Business Capacity," Proceedings of the 3rd ACM Conference on Electronic Commerce (EC '01), Oct. 2001, pp. 235-244.
E. Hubbert et al., "The Capacity Planning Software Market Sustaining Application Performances," Forrester Research, Inc., Jun. 2007, pp. 1-4.
Y. Diao et al., "Stochastic Modeling of Lotus Notes with a Queueing Model," Computer Measurement Group International Conference (CMG 2001), Dec. 2001, pp. 229-238.
B. Callaway et al., "Enable XML Awareness in WebSphere Extended Deployment with WebSphere DataPower SOA Appliances," White Paper on IBM DeveloperWorks, Jul. 2006, 13 pages.

(Continued)

*Primary Examiner* — Chante Harrison
(74) *Attorney, Agent, or Firm* — Anne V. Dougherty; Ryan, Mason & Lewis, LLP (57) ABSTRACT

An exemplary method of determining a target configuration of an infrastructure aligned with a template includes a step of representing the current configuration of the infrastructure as a graph having a plurality of vertices representing elements of the infrastructure and at least one edge representing at least one dependency between the elements, wherein a given element within a set of possible elements for the infrastructure has a set of possible equivalent elements for the given element. The exemplary method also includes a step of finding at least one cut vertex in the graph representing the current configuration of the infrastructure, wherein removal of the cut vertex will split the graph into two sub-graphs as close in size as possible.

25 Claims, 4 Drawing Sheets

CUT VERTEX

OTHER PUBLICATIONS

N. Bobroff et al., "Dynamic Placement of Virtual Machines for Managing SLA Violations," 10th IFIP/IEEE International Symposium on Integrated Network Management (IM '07), May 2007, pp. 119-128.

M. Badaloo, "An Examination of Server Consolidation: Trends that can Drive Efficiencies and Help Businesses Gain a Competitive Edge," White Paper on IBM Global Services, Dec. 2006, 16 pages.

S. Even, "Graph Algorithms," Computer Science Press, 1979, pp. 1-64, Chapters 1-6.

X. Liu et al., "Optimizing Overlay Topology by Reducing Cut Vertices," International Workshop on Network and Operating Systems Support for Digital Audio and Video (ACM NOSSDAV 2006), May 2006, pp. 99-104.

Q. Ma et al., "Model-Based Dependency Management for Migrating Service Hosting Environment," IEEE International Conference on Services Computing (SCC 2007), Jul. 2007, pp. 356-363.

K.T. Newport et al., "Design of Survivable Communications Networks under Performance Constraints," IEEE Transactions on Reliability, Oct. 1991, pp. 433-440, vol. 40, No. 4.

C.R. Rich, "TADDM's Flexible Approach to Discovery," IBM, Jul. 2007, pp. 1-17.

* cited by examiner

CUT VERTEX

FIG. 4

```
CutSearch(G, c, e)
 1: if G is small or has no cut vertex then
 2:    Run the brute-force algorithm and retun its result.
 3: else
 4:    Search for the cut vertex v that minimizes the
       difference in size of the two induced sub-graphs.
 5:    Let C_v be the class of vertex v.
 6:    for each v' ∈ C_v do
 7:       Split G into two sub-graphs G_1 and G_2 along v
          and re-label vertex v with v'.
 8:       Make recursive calls CutSearch(G_1, c, e) and
          CutSearch(G_2, c, e).
 9:       If both graphs have solutions, put both solutions
          together to get a solution for G, and compare
          the cost to that of the best solution so far.
10:    end for
11:    Return the best solution found.
12: end if
```

FIG. 5 ures fully supported, or "cloning" an existing supported configuration of one element to replace an unsupported configuration of another instance of the same element.

METHOD AND APPARATUS FOR ALIGNING AN INFRASTRUCTURE TO A TEMPLATE

CROSS-REFERENCE TO RELATED APPLICATION

The present application is related to commonly-assigned U.S. patent application Ser. No. 11/972,857, filed concurrently herewith, the disclosure of which is incorporated by reference herein.

FIELD OF THE INVENTION

The present invention relates generally to infrastructure maintenance, and more particularly relates to techniques for aligning an infrastructure to a template.

BACKGROUND OF THE INVENTION

Organizations with complex IT (information technology) environments face the issue of what changes to make to their environment in order to enhance their services, for example by correcting failures that have occurred, maintaining or improving performance and availability, or expanding capacity to serve more users.

When they contact their maintenance support service to address this issue, the maintenance service faces the challenge of providing resolutions that both minimize the risk of unavailability by minimizing the number of changes needed in the customer's environment and maximize the benefit of applying the resolution by increasing automation, while remaining cost-effective for both the customer and the maintenance service provider.

Existing solutions that enable maintenance support to provide resolutions to the customer are primarily directed at specific resolution niches. These approaches do not provide a holistic maintenance service approach involving multiple resolution types for a given problem, nor do they optimize across different resolutions.

Accordingly, there exists a need for an improved technique of comparing different possible resolutions in terms of their cost, benefit and risk, for both the customer and maintenance support.

SUMMARY OF THE INVENTION

An exemplary method of determining a target configuration of an infrastructure aligned with a template includes a step of representing the current configuration of the infrastructure as a graph having a plurality of vertices representing elements of the infrastructure and at least one edge representing at least one dependency between the elements, wherein a given element within a set of possible elements for the infrastructure has a set of possible equivalent elements for the given element. The exemplary method also includes a step of finding at least one cut vertex in the graph representing the current configuration of the infrastructure, wherein removal of the cut vertex will split the graph into two sub-graphs as close in size as possible.

The method includes a step of, for each element within the set of possible equivalent elements for the cut vertex, replacing the cut vertex with a given element within the set of possible equivalent elements for the cut vertex. The method includes a step of splitting the graph into the two sub-graphs, wherein each sub-graph includes a copy of the replaced cut vertex and edges between the replaced cut vertex and other vertices of the sub-graph. The method includes a step of recursively determining whether both sub-graphs contain at least one cut vertex wherein removal of the cut vertex will splits the sub-graph into two sub-graphs as close in size as possible.

The method also includes a step of, responsive to a determination that both sub-graphs contain at least one cut vertex wherein removal of the cut vertex will splits the sub-graph into two sub-graphs as close in size as possible, rejoining both sub-graphs so as to form a graph representing the target infrastructure, the graph having a plurality of vertices representing elements of the infrastructure and at least one edge representing at least one dependency between the elements.

Techniques according to embodiments of the present invention advantageously permit for a quick determination of an optimal alignment of the customer's IT infrastructure to a maintenance service's supported products by making the customer's infrastructure consistent with the constraints of one or more best practices templates.

These and other objects, features and advantages of the present invention will become apparent from the following detailed description of illustrative embodiments thereof, which is to be read in connection with the accompanying drawings.

DETAILED DESCRIPTION OF THE INVENTION

The present invention will be described herein in the context of illustrative methodologies for aligning an infrastructure to a template. It should be understood, however, that although the present invention is described herein primarily as applied to alignment of an IT infrastructure to a template, inventive techniques may be applicable to alignment of an infrastructure to a template within any number of fields. More generally, inventive techniques may also be applicable to simplifying graph search problems within any number of fields.

A key step of in an automated method of providing an optimized resolution to a problem in an infrastructure, such as one according to an illustrative embodiment described in U.S. patent application Ser. No. 11/972,857, is that of aligning a customer's environment to a template.

This step typically comprises determining at least one target configuration of the infrastructure aligned with at least one template. This step may include, for example, replacing non-supported elements found in the current infrastructure with equivalent supported elements so as to render the infrastructure consistent with a template. Preferably, this alignment should use the minimum number of changes and take into account any special customer restrictions. This alignment advantageously helps to match the customer's cost expectations and minimize the maintenance provider service cost.

This optimized migration is the major challenge for the maintenance service provider because of the multiple potential customer restrictions, e.g., minimum costs of changes, minimum or no changes of the products directly related to their applications, software restrictions, etc. Moreover, this optimization facilitates the use of the automated remediation operations built off-line for the template. Because most IT infrastructures rely on redundancy at one or more of the stack layers, e.g., application, middleware, hardware, the technique may consider only the base pattern of the IT infrastructure, with unique products, rather than the whole IT environment with duplicates. The results of the alignment are applied seamlessly to all the infrastructure products, regardless of duplication.

Figure 1:
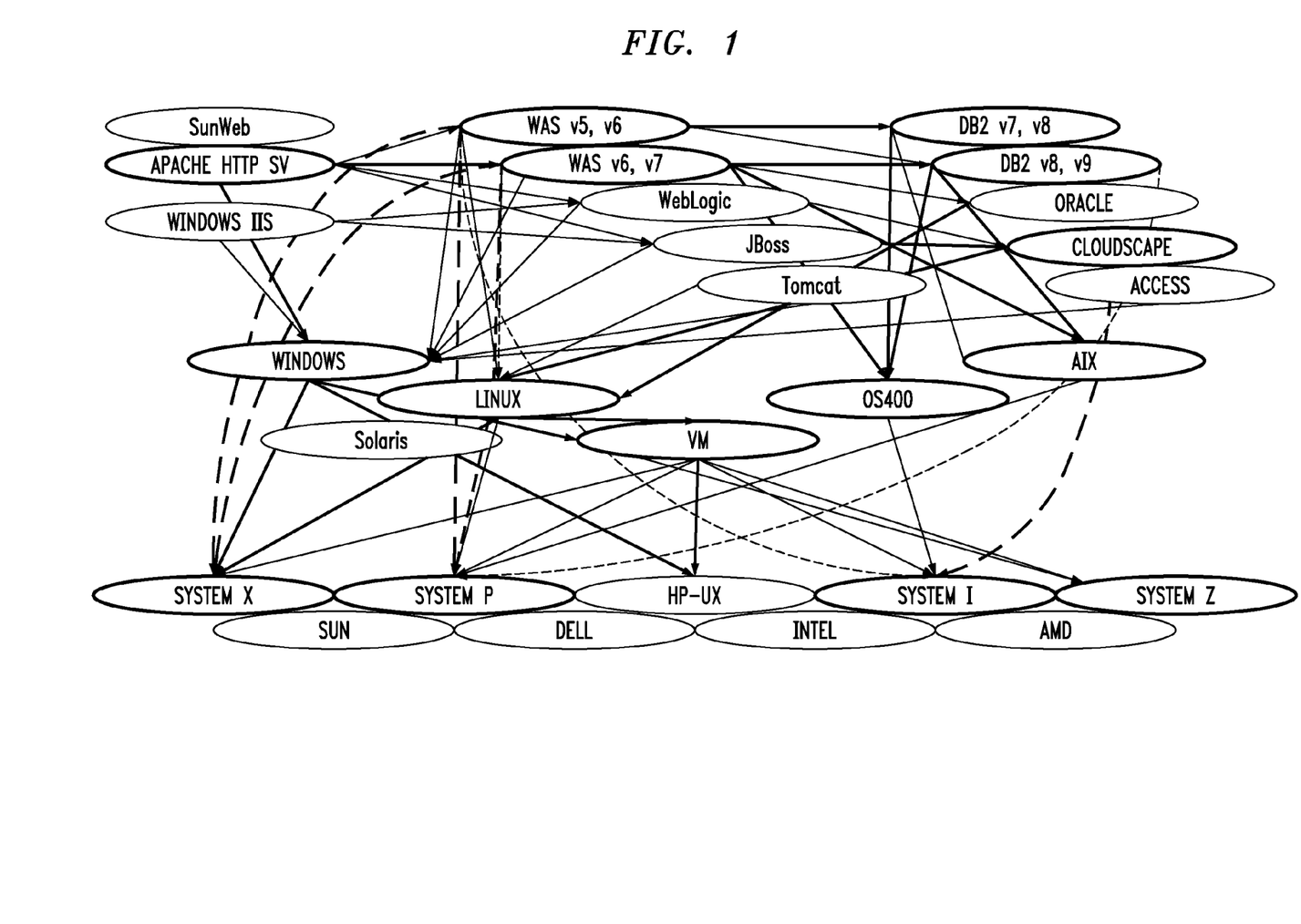
FIG. 1 illustrates an exemplary configuration template suitable for use with an illustrative embodiment of the present invention.

FIG. 1 illustrates an exemplary configuration template suitable for use with an illustrative embodiment of the present invention. It should be noted that techniques of the present invention do not require the use of any given configuration template; rather, configuration templates in a variety of formats and/or containing differing quantities and types of information may also be used with the present invention.

The bold nodes in FIG. 1 identify the supported products, e.g., those which should be contained within the target infrastructure. Examples of such products and their dependencies are: "Web application server M version a.b.c works with database server N version x.y.z"; "Web application server M version a.b.c works on Linux Suze version n.m." The solid arrows in FIG. 1 indicate such configuration dependencies. Lack of an arrow indicates either an unfeasible configuration or a constraint on a potential dependency that is unsupported.

Configuration conflicts are another potential type of constraint. Examples of software conflict constraints are: "Windows Defender has issues on Windows Vista," "Websphere AS v5 on AIX conflicts with Oracle Web Services Manager."

Classes of equivalence indicate which products provide similar functionality. Examples of classes of equivalence are: "Web application servers are: WebLogic, JBoss, JRun, Tomcat," "Database servers are: DB2, Access, dBase, MySQL, Oracle, SyBase." In FIG. 1, the nodes clustered together belong to the same class of equivalence.

Figure 3:
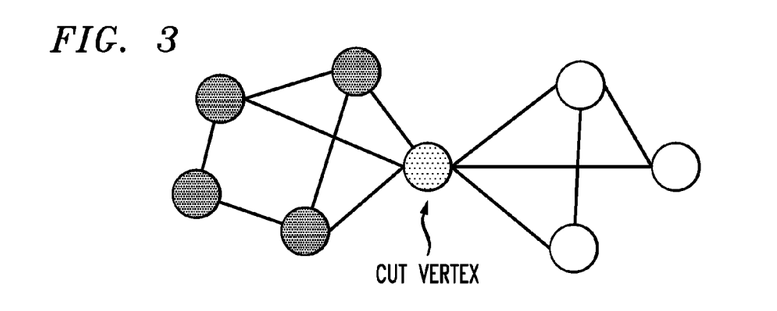
FIG. 3 is an exemplary graph intended to illustrate the concept of a cut vertex.

Dependencies like amount of RAM, hard drive or CPU required by particular products, which need to be summed up on each machine, are indicated by the dashed arrows in FIG. 1. Note that not all valid dependencies and other constraints are shown in FIG. 3 for visibility reasons.

Figure 2A:
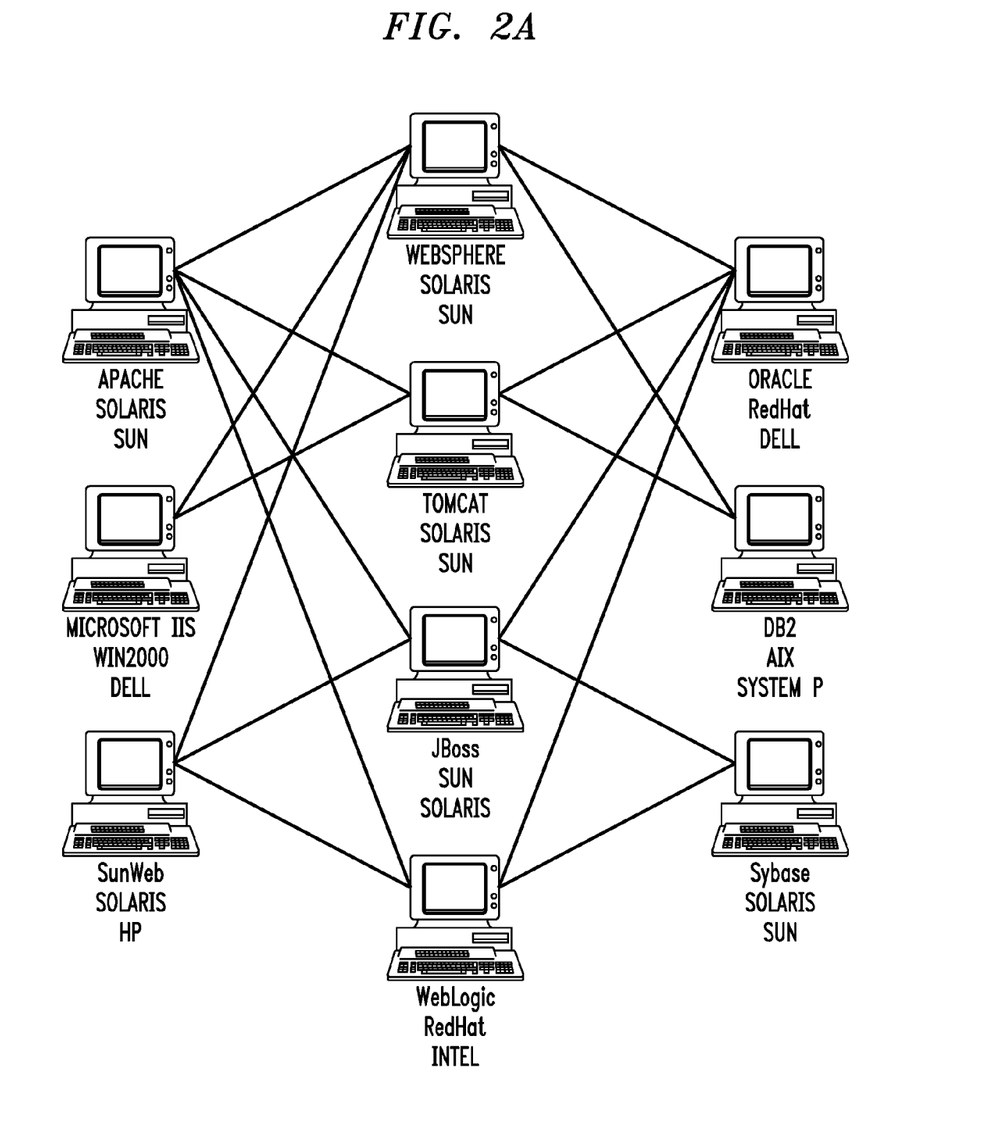
FIG. 2A represents a possible configuration of an exemplary infrastructure which is incompatible with the template shown in FIG. 1.

FIG. 2A represents a possible configuration of an exemplary infrastructure which is incompatible with the template shown in FIG. 1.

Figure 2B:
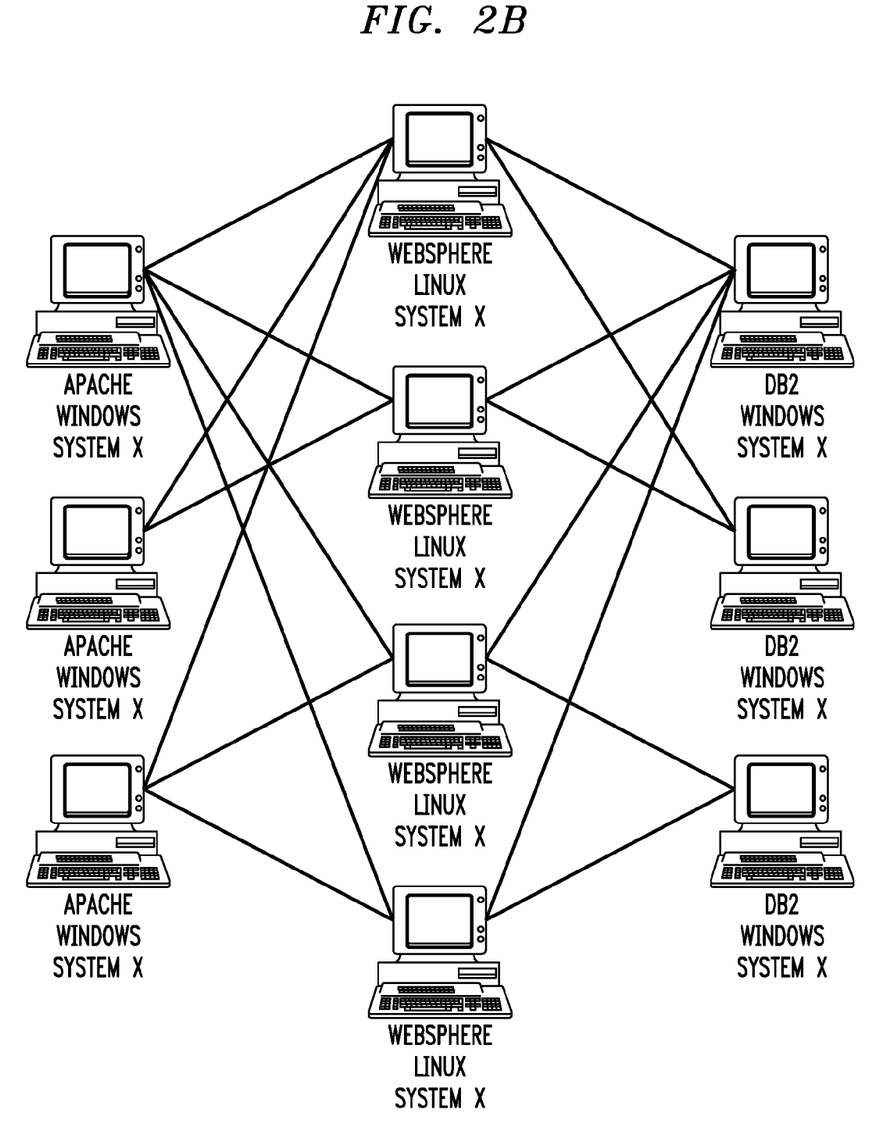
FIG. 2B represents a possible target configuration of the exemplary infrastructure shown in FIG. 2A after an alignment according to an illustrative embodiment of the present invention.

FIG. 2B represents a possible target configuration of the exemplary infrastructure shown in FIG. 2A after an alignment according to an illustrative embodiment of the present invention. Specifically, non-supported elements found in the current infrastructure have been replaced with equivalent supported elements so as to render the infrastructure consistent with the template shown in FIG. 1.

A universe of objects that may be present within a given infrastructure may be formally represented as $$V = \bigcup_i C_i,$$

where $C_i$ are pair-wise disjoint classes. As will be discussed hereinafter, each class represents a set of objects that can be substituted for one another and designates a class of equivalence as previously described with reference to FIG. 1, which is an example of a graph $G=(V, E)$, which expresses the relationships between objects in V.

The current infrastructure may also be represented as a graph, $S=(V',E')$, where V' comprises the set V but with some objects appearing zero or more times. That is, for any node $v \in V$, V' may have k copies of this node represented as $v_1, \ldots, v_k$, for some k. These copies are referred to as separate instances of the same object. Since a particular product may appear several times in the customer environment (e.g., there may be multiple copies of WAS v6 running on different machines), this concept of instances may be used to distinguish them. Dependencies in the customer environment can be obtained using an automatic dependency discovery tool or may be present within a template, such as that shown in FIG. 1.

Objects within a class can be substituted for one another according to a substitution cost function $c: V \times V \to \mathbb{R}_+$, where $c(v_1, v_2) = \infty$ for $v_1$ and $v_2$ in separate classes. This function has the property that, for all x, $c(x, x)=0$ (since there is no migration cost when there is no product change). The substitution cost is computed by taking into account all relevant costs, such as product costs, administration costs, and downtime costs. These costs may then be weighting appropriately to reflect the customer's preferences or criteria of optimization; e.g., if the customer requires that particular products not be changed, their substitution cost can be made very large. We extend the cost function to the domain $V' \times V'$, treating each instance identically to the original.

An edge cost function $e: V' \times V' \times V \times V \to \mathbb{R}$, represents the cost of replacing a link between two objects in the customer's current environment by a link between two objects in the template. It has the property that if x' is an instance of x and y' is an instance of y, then $e(x', y', x, y)=0$. That is, if the pair remains unchanged, there is no edge cost.

The alignment process may be characterized as the transformation of the current infrastructure graph S to a target infrastructure graph T by replacing some vertices in S by objects in the corresponding class, subject to the constraint that every edge in T must also be an edge in the template graph G. The goal is to find the minimum cost transformation (assuming that one exists).

More formally, the goal is to find a function $f: V' \to V$ that re-labels the vertices of S in such a way that, for every edge $(v_1, v_2) \in E'$, $(f(v_1), f(v_2)) \in E$ such that the total cost $$\sum_{v \in V'} c(v, f(v)) + \sum_{(u,v) \in E'} e(u, v, f(u), f(v))$$

is minimized. This problem can be shown to be NP-complete. The heuristic algorithm described herein efficiently prunes the search space, thereby quickly producing the optimal solution (assuming that one exists).

FIG. 3 is an exemplary graph intended to illustrate the concept of a cut vertex. A cut vertex (or articulation vertex) is one whose removal, along with all its incident edges, results in a disconnected graph. For example, with reference to FIG. 3, the removal of the grey node, along with its incident edges, will result in the graph comprising the black nodes being disconnected from the graph comprising the white nodes. An arbitrary graph need not have a cut vertex; any graph that does not contain a cut vertex is called biconnected. Note, however, that any graph that has a vertex of degree one must have a cut vertex.

Cut vertices are undesirable when designing a network (since they a potential single point of failure operative to disconnect the network). Indeed, cut vertices are commonly studied with the view of removing them from a network. Nonetheless, IT infrastructure graphs typically have many cut vertices. Such vertices often occur since the individual machines are linked with their operating system only. More generally, it is usually possible to partition the functionality of different clusters of machines along one (or a few) vertices.

Figure 4:
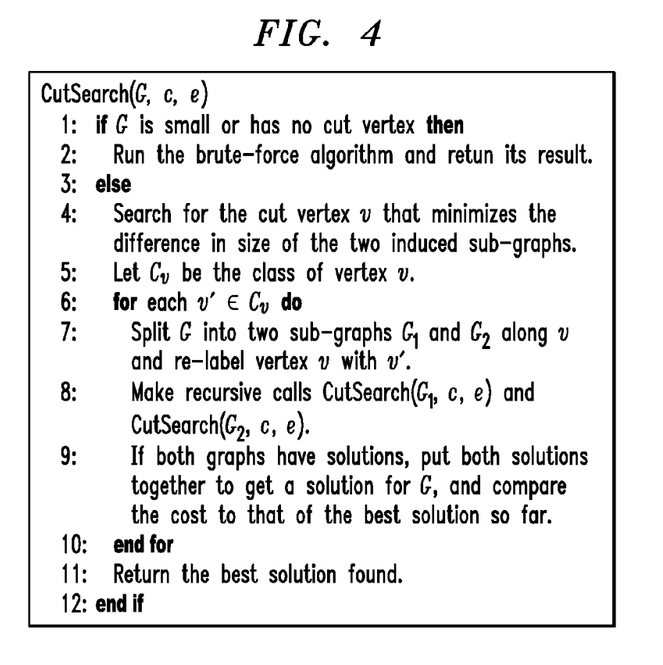
FIG. 4 is a pseudocode implementation of an exemplary algorithm for alignment according to an illustrative embodiment of the invention.

The pseudocode in FIG. 4 illustrates an exemplary algorithm for alignment according to a preferred embodiment of the present invention. This algorithm exploits the disconnecting property of cut vertices to simplify a graph search problem by facilitating recursion on smaller sub-problems.

Specifically, the exemplary algorithm iterates through the vertices of the current infrastructure graph S, identifying each cut vertex and the relative size of the sub-graphs it cuts the original graph into, with the goal of finding a cut vertex that splits the original graph into two sub-graphs as close in size as possible. (Ties between cut vertices may be broken randomly or using any other technique known to one skilled in the art.) This technique advantageously permits the reduction of a larger problem to two smaller problems of roughly even size and facilitates a recursive solution.

A technique, suitable for use with illustrative embodiments of the present invention, for identifying cut vertices in a graph is to iterate over the vertices and test, for each vertex, whether removing it disconnects the graph, although more efficient algorithms for identifying cut vertices are known. A preferred algorithm suitable for use with illustrative embodiments of the present invention is described in, for example, S. Even. *Graph Algorithms*. W. H. Freeman & Co., New York, N.Y., USA, 1979, the disclosure of which is incorporated by referenced herein.

Once the "best" cut vertex is found (i.e., the cut vertex which separates the original graph into two sub-graphs as close in size as possible), the graph is split into two sub-graphs, each including a copy of the cut vertex and its edges to that sub-graph. Then, the vertex is mapped to each object in its equivalence class. The problem is then recursively on the two induced sub-graphs. If there is a feasible solution for both sub-graphs, then the graphs are stitched back together, the cost of the solution may be computed using, for example, the c and e cost functions as shown in the section, and compare the cost of this solution to the best so far.

The search problem may be further simplified by exploiting the fact that every edge in the target graph T must also be an edge in the template graph G, thus constraining the possibilities for each vertex. As different possibilities for a cut vertex are tried, the list of possible objects may be pruned at each of the neighbors of the cut vertex. If the set of possible objects for a neighbor of the cut vertex gets pruned down to a single element, its neighbors may likewise be recursively pruned, which also reduces the search space considerably.

For graphs that do not have a cut vertex (i.e., bi-connected graphs) and graphs that are smaller than a certain size (e.g., four vertices), the naive depth-first search may be used to exhaustively find the solution. In the worst case, the algorithm does not find a cut vertex for the original graph and is identical to brute-force depth-first search.

As may be formally proved by induction by one having skill in the art, this recursive solution always returns the optimal solution since it is guaranteed to give the optimal solution. Moreover, the algorithm shown in FIG. 4 may be generalized by one having skill in the art from a single cut vertex to sets of vertices (e.g., identifying pairs of vertices the removal of which disconnects the graph). However, doing so would result in additional overhead in the resulting algorithm, especially when contrasted with the efficiency of the simpler single cut vertex algorithm shown in FIG. 4.

Figure 5:
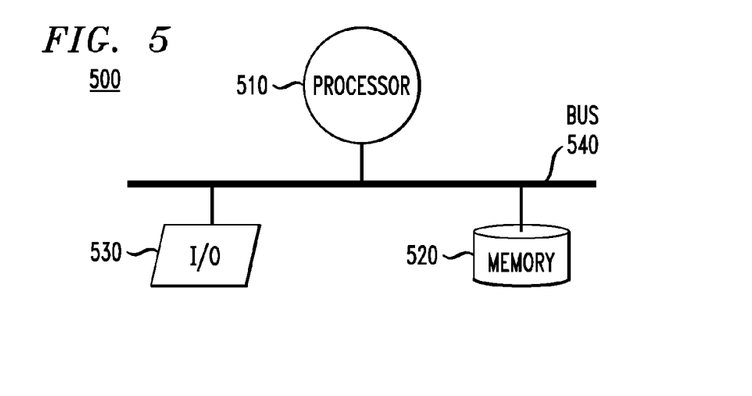
FIG. 5 is a block diagram depicting an exemplary processing system in which inventive techniques may be implemented.

The methodologies of embodiments of the invention may be particularly well-suited for use in an electronic device or alternative system. For example, FIG. 5 is a block diagram depicting an exemplary processing system 500 formed in accordance with an aspect of the invention. System 500 may include a processor 510, memory 520 coupled to the processor (e.g., via a bus 540 or alternative connection means), as well as input/output (I/O) circuitry 530 operative to interface with the processor. The processor 510 may be configured to perform at least a portion of the methodologies of the present invention, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 510. In any case, it is to be appreciated that at least a portion of the components shown in the above figures may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A processor-implemented method of determining a target infrastructure aligned with a template, the method comprising the steps of:

representing a current infrastructure as a graph having a plurality of vertices representing elements of the current infrastructure and at least one edge representing at least one dependency between the elements of the current infrastructure, wherein a given element within a set of possible elements for the infrastructure has a set of possible equivalent elements for the given element;

finding at least one cut vertex in the graph representing the current configuration of the infrastructure, wherein removal of the cut vertex will split the graph into two sub-graphs as close in size as possible; and for each element within the set of possible equivalent elements for the cut vertex:

replacing the cut vertex with a given element within the set of possible equivalent elements for the cut vertex;

splitting the graph into the two sub-graphs, wherein each sub-graph includes a copy of the replaced cut vertex and edges between the replaced cut vertex and other vertices of the sub-graph;

recursively determining whether both sub-graphs contain at least one cut vertex wherein removal of the cut vertex will split the sub-graph into two sub-graphs as close in size as possible; and responsive to a determination that both sub-graphs contain at least one cut vertex wherein removal of the cut vertex will split the sub-graph into two sub-graphs as close in size as possible, rejoining both sub-graphs so as to form a graph representing the target infrastructure, the graph having a plurality of vertices representing elements of the target infrastructure and at least one edge representing at least one dependency between the elements of the target infrastructure;

wherein the steps are performed by a processor.

2. The method of claim 1, further comprising the steps of:
determining a cost associated with the target infrastructure relative to the current infrastructure; and
comparing each target infrastructure with the current infrastructure so as to determine the target infrastructure with the lowest cost.

3. The method of claim 2, wherein the determined cost comprises a sum of at least one edge cost and at least one vertex cost.

4. The method of claim 1, wherein the template is represented as a graph such that every edge in the target infrastructure graph must also be an edge in the template graph.

5. The method of claim 4, further comprising the step of pruning a set of possible equivalent elements for each of the neighbors of the cut vertex.

6. The method of claim 5, further comprising the step of, if the set of possible equivalent elements for a given neighbor of the cut vertex is pruned down to a single element, recursively pruning the sets of equivalent elements for neighbors of the given neighbor.

7. The method of claim 1, further comprising the steps of:
determining whether the graph is biconnected; and
responsive to a determination that the graph is biconnected, using a depth-first search.

8. The method of claim 1, further comprising the steps of:
determining whether the graph contains fewer than a given number of vertices; and
responsive to a determination that the graph contains fewer than a given number of vertices, using a depth-first search.

9. The method of claim 1, wherein each element within the set of possible elements for an infrastructure is a member of one of a set of pair-wise disjoint classes and wherein members of a given one of the set of pair-wise disjoint classes are equivalent elements.

10. The method of claim 1, wherein only unique instances of elements within the infrastructure are considered.

11. An apparatus for determining a target infrastructure aligned with a template, the apparatus comprising:
a memory; and
a processor coupled to the memory and operative to perform the operations of:

representing a current infrastructure as a graph having a plurality of vertices representing elements of the current infrastructure and at least one edge representing at least one dependency between the elements of the current infrastructure, wherein a given element within a set of possible elements for the infrastructure has a set of possible equivalent elements for the given element;

finding at least one cut vertex in the graph representing the current configuration of the infrastructure, wherein removal of the cut vertex will split the graph into two sub-graphs as close in size as possible; and for each element within the set of possible equivalent elements for the cut vertex:

replacing the cut vertex with a given element within the set of possible equivalent elements for the cut vertex;

splitting the graph into the two sub-graphs, wherein each sub-graph includes a copy of the replaced cut vertex and edges between the replaced cut vertex and other vertices of the sub-graph;

recursively determining whether both sub-graphs contain at least one cut vertex wherein removal of the cut vertex will split the sub-graph into two sub-graphs as close in size as possible; and responsive to a determination that both sub-graphs contain at least one cut vertex wherein removal of the cut vertex will split the sub-graph into two sub-graphs as close in size as possible, rejoining both sub-graphs so as to form a graph representing the target infrastructure, the graph having a plurality of vertices representing elements of the target infrastructure and at least one edge representing at least one dependency between the elements of the target infrastructure.

12. The apparatus of claim 11, wherein the processor is further operative to perform the operations of:
determining a cost associated with the target infrastructure relative to the current infrastructure; and
comparing each target infrastructure with the current infrastructure so as to determine the target infrastructure with the lowest cost.

13. The apparatus of claim 12, wherein the determined cost comprises a sum of at least one edge cost and at least one vertex cost.

14. The apparatus of claim 11, wherein the template is represented as a graph such that every edge in the target infrastructure graph must also be an edge in the template graph.

15. The apparatus of claim 14, wherein the processor is further operative to perform the operation of pruning a set of possible equivalent elements for each of the neighbors of the cut vertex.

16. The apparatus of claim 15, wherein the processor is further operative to perform the operation of, if the set of possible equivalent elements for a given neighbor of the cut vertex is pruned down to a single element, recursively pruning the sets of equivalent elements for neighbors of the given neighbor.

17. The apparatus of claim 11, wherein each element within the set of possible elements for an infrastructure is a member of one of a set of pair-wise disjoint classes and wherein members of a given one of the set of pair-wise disjoint classes are equivalent elements.

18. The apparatus of claim 11, wherein only unique instances of elements within the infrastructure are considered.

19. An article of manufacture for determining a target infrastructure aligned with a template, the article comprising a storage medium encoded with one or more software programs that, when executed by a processor, perform the steps of:
   representing a current infrastructure as a graph having a plurality of vertices representing elements of the current infrastructure and at least one edge representing at least one dependency between the elements of the current infrastructure, wherein a given element within a set of possible elements for the current infrastructure has a set of possible equivalent elements for the given element;
   finding at least one cut vertex in the graph representing the current configuration of the infrastructure, wherein removal of the cut vertex will split the graph into two sub-graphs as close in size as possible; and
   for each element within the set of possible equivalent elements for the cut vertex:
      replacing the cut vertex with a given element within the set of possible equivalent elements for the cut vertex;
      splitting the graph into the two sub-graphs, wherein each sub-graph includes a copy of the replaced cut vertex and edges between the replaced cut vertex and other vertices of the sub-graph;
      recursively determining whether both sub-graphs contain at least one cut vertex wherein removal of the cut vertex will split the sub-graph into two sub-graphs as close in size as possible; and
      responsive to a determination that both sub-graphs contain at least one cut vertex wherein removal of the cut vertex will split the sub-graph into two sub-graphs as close in size as possible, rejoining both sub-graphs so as to form a graph representing the target infrastructure, the graph having a plurality of vertices representing elements of the target infrastructure and at least one edge representing at least one dependency between the elements of the target infrastructure.

20. The article of claim 19, wherein the one or more programs, when executed, perform the further steps of:
   determining a cost associated with the target infrastructure relative to the current infrastructure; and
   comparing each target infrastructure with the current infrastructure so as to determine the target infrastructure with the lowest cost.

21. The article of claim 20, wherein the determined cost comprises a sum of at least one edge cost and at least one vertex cost.

22. The article of claim 19, wherein the template is represented as a graph such that every edge in the target infrastructure graph must also be an edge in the template graph.

23. The article of claim 22, wherein the one or more programs, when executed, perform the further steps of pruning a set of possible equivalent elements for each of the neighbors of the cut vertex.

24. The article of claim 23, wherein the one or more programs, when executed, perform the further steps of, if the set of possible equivalent elements for a given neighbor of the cut vertex is pruned down to a single element, recursively pruning the sets of equivalent elements for neighbors of the given neighbor.

25. The article of claim 19, wherein each element within the set of possible elements for an infrastructure is a member of one of a set of pair-wise disjoint classes and wherein members of a given one of the set of pair-wise disjoint classes are equivalent elements.

* * * * *